United States Patent [19]
Lewis

[11] 3,768,249
[45] Oct. 30, 1973

[54] FUEL SUPPLY SYSTEMS FOR GAS TURBINE ENGINES

[75] Inventor: Geoffrey Arthur Lewis, Solihull, England

[73] Assignee: Joseph Lucas (Industries) Limited, Birmingham, England

[22] Filed: Feb. 10, 1972

[21] Appl. No.: 225,174

[30] Foreign Application Priority Data
Feb. 15, 1971 Great Britain.................... 4,624/71

[52] U.S. Cl............. 60/39.14, 60/39.28 R, 137/117
[51] Int. Cl............................................... F02c 9/10
[58] Field of Search................... 60/39.14, 39.28 R; 137/117

[56] References Cited
UNITED STATES PATENTS

| | | | |
|---|---|---|---|
| 3,078,670 | 2/1963 | Werner | 60/39.28 R |
| 3,611,717 | 10/1971 | Tissier | 60/39.14 |
| 3,593,736 | 7/1971 | White | 60/39.14 |
| 2,986,881 | 6/1961 | Moore | 60/39.14 |
| 3,151,452 | 10/1964 | Bunger et al. | 60/39.14 |
| 3,282,323 | 11/1966 | Katz et al. | 60/39.14 |

Primary Examiner—Clarence R. Gordon
Assistant Examiner—Warren Olsen
Attorney—John C. Holman et al.

[57] ABSTRACT

A fuel control system for a gas turbine engine includes an injection device which can be charged with fuel and which is operable when the engine is started to deliver this charge of fuel directly to the engine.

10 Claims, 2 Drawing Figures

FIG.I.

FUEL SUPPLY SYSTEMS FOR GAS TURBINE ENGINES

This invention relates to fuel supply systems for gas turbine engines, and has as an object to provide such a system in a convenient form.

A fuel supply system in accordance with the invention comprises a fixed displacement fuel pump driven, in use, at a speed proportional to the engine speed, a valve including a chamber having an inlet connected to the outlet of the pump and first and second outlets and a control element variably positionable between said outlets so as to vary the effective flow area of the two outlets simultaneously, a pressure control unit sensitve to the pressure at said two outlets and arranged to spill sufficient fuel from the first outlet to maintain the ratio of said pressures substantially constant, means for positioning the control element of the valve in accordance with the fuel requirement of the engine, and a fuel injection device including a further chamber, means for charging said further chamber with fuel, and means operable during engine starting, for discharging the contents of said chamber to a position downstream of said second outlet.

Embodiments of the invention will now be described by way of example and with reference to the accompanying drawings in which.

Figure 1:
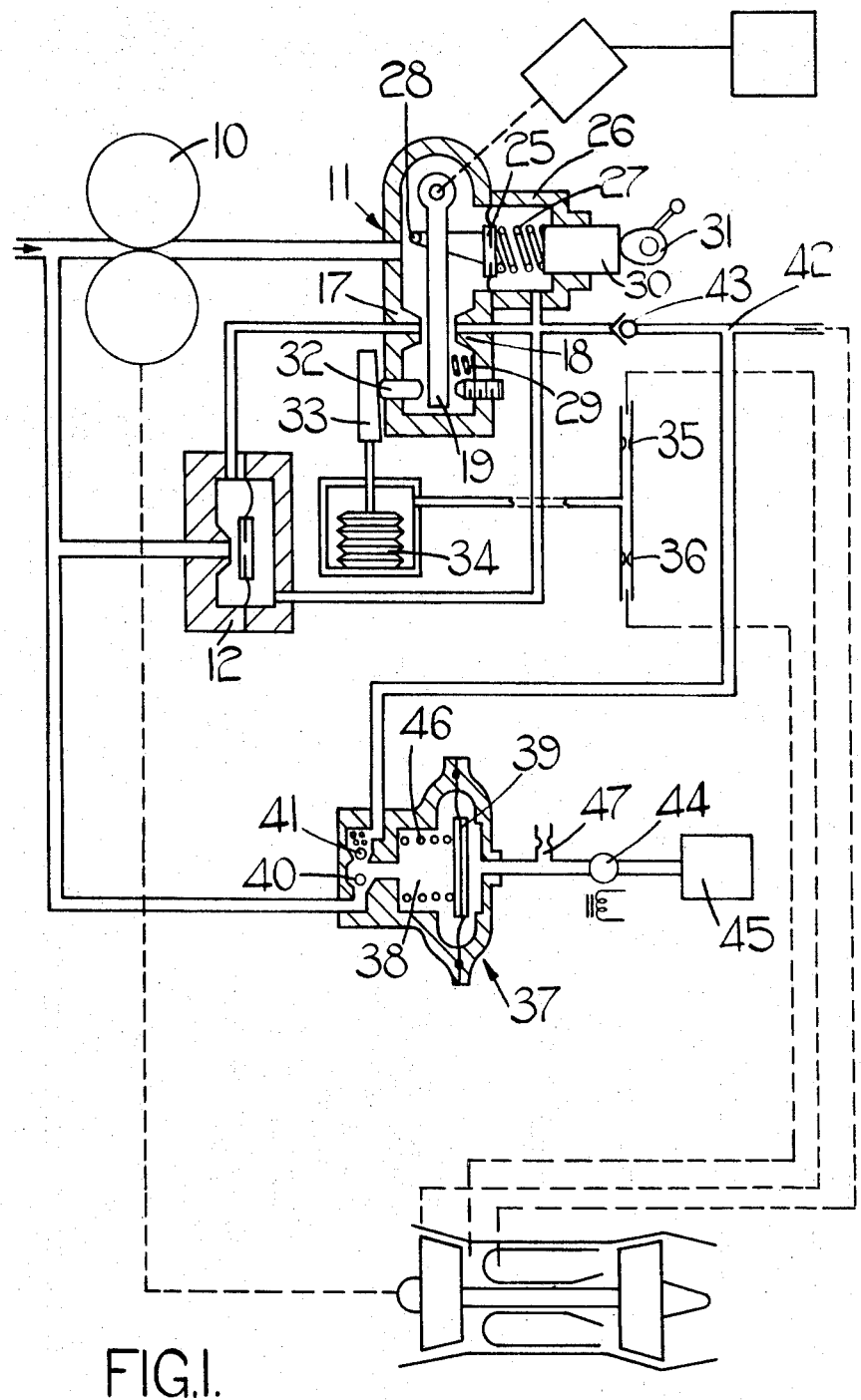
FIG. 1 shows a fuel system diagrammatically.

The system shown in FIG. 1 is substantially that shown and described in our co-pending U.S. Patent application No: 195970 and comprises a fixed displacement pump 10, arranged to receive fuel from a low pressure boost pump (not shown), a valve 11 and a pressure control unit 12 responsive to the pressure at a first outlet 17 of valve 11, fuel being delivered, in use, to the engine via a second outlet 18 of valve 11. Control element 19 of valve 11 is engageable by an abutment 28 forming part of a top-speed governor responsive both to a pressure downstream of outlet 18 and to the setting of a lever 31. Control element 19 is also engageable with an acceleration control stop 32 positioned in accordance with the pressures $P_1$ and $P_2$ at the engine air intake and compressor delivery respectively.

Also provided is an injector pump 37 having a chamber 38 one wall of which is defined by a diaphragm 39. Chamber 38 communicates via a non-return valve 40 with the inlet of pump 10, the arrangement being that fuel can flow only from the inlet of pump 10 to chamber 38. Chamber 38 also communicates via a spring-loaded relief valve 41 with a point 42 downstream of outlet 18. A non-return valve 43 is provided between point 42 and outlet 18.

The side of diaphragm 39 remote from chamber 38 communicates via a solenoid-operated valve 44 with a source 45 of high air pressure, and also via a restrictor 47 with atmosphere. Diaphragm is biased by a spring 46 against the pressure applied from source 45.

In use, with valve 44 shut, diaphragm 39 moves to the right, as seen in the drawing, under the influence of spring 46 to draw fuel into chamber 38 via non-return valve 40, valve 44 is energised for a limited period when the engine is started and diaphragm 39 compresses spring 46 to discharge the fuel in chamber 38 via relief valve 41 to the engine. Non-return valves 40, 43 respectively prevent this fuel from passing to the pump inlet or to outlet 18. A measured quantity of fuel is thus injected into the engine during starting.

Figure 2:
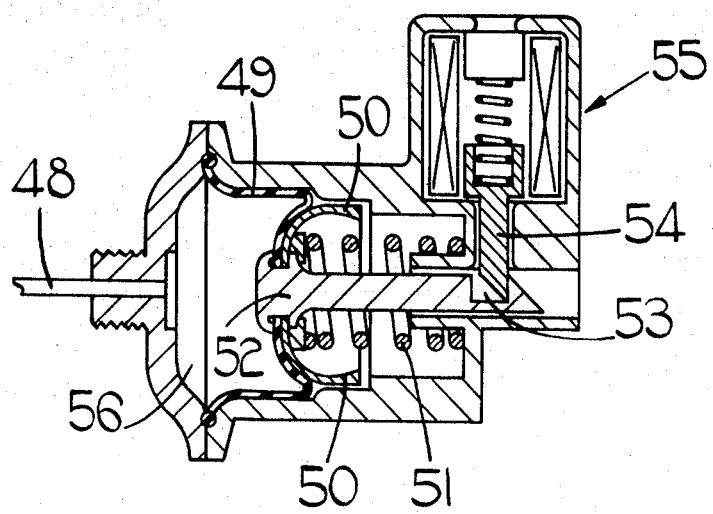
FIG. 2 shows an alternative form of a part of the system of FIG. 1.

FIG. 2 shows an alternative form of injector pump, having a chamber 56 from which extends a passage 48 communicating with the point 42 previously described downstream of non-return valve 43. One wall of chamber 56 is defined by a rolling diaphragm 49 which engages a piston element 50 biased against the pressure in chamber 56 by a spring 51. A stem 52 extends from piston element 50 on the side thereof, remote from chamber 56 and is formed with a recess 53 engageable with the plunger 54 of a solenoid 55 when the piston element is in its extreme right hand position, as seen in the drawing.

In use, with the engine running, fuel under pressure enters chamber 56 to compress spring 51 and to latch piston element 50, solenoid 55 not being energised in these conditions. When the engine is shut down piston element 50 remains latched back against spring 51. Solenoid 55 is energised for a short period when the engine is started, and the fuel in chamber 56 is discharged to the engine, as before. This arrangement thus requires no external pressure source, the device being charged during a preceding operation of the engine.

I claim:

1. A fuel supply system for a gas turbine engine, comprising a fixed displacement pump, driven in use, at a speed proportional to the engine speed, a valve including a chamber having an inlet connected to the outlet of the pump and first and second outlets and a control element variably positionable between said outlets so as to vary the effective flow area of the two outlets simultaneously, a pressure control unit sensitive to the pressures at said two outlets and arranged to spill sufficient fuel from the first outlet to maintain the ratio of said pressures substantially constant, means for positioning the control element of the valve in accordance with the fuel requirement of the engine, and a fuel injection device including a further chamber, means for charging said further chamber with fuel, and means operable during engine starting, for discharging the contents of said chamber to a position downstream of said second outlet.

2. A system as claimed in claim 1 in which the means for charging the further chamber comprises a passage connecting said further chamber with the upstream side of said pump, and a non-return valve to prevent flow of fuel from said further chamber back to said upstream side of the pump.

3. A system as claimed in claim 1 in which the means for discharging the contents of said further chamber comprises a diaphragm defining a wall of said further chamber, means for moving said diaphragm to reduce the volume of said further chamber, a further passage connecting said further chamber with said downstream position and a non-return valve associated with said further passage to prevent flow of fuel from said downstream position to said further chamber.

4. A system as claimed in claim 3 in which the means for moving said diaphragm comprises an arrangement for applying a fluid pressure to the side of said diaphragm remote from said further chamber.

5. A system as claimed in claim 4 in which said arrangement comprises a fluid pressure source, a control valve between said source and said diaphragm and a fluid flow restrictor through which pressure downstream of said control valve can escape to atmosphere.

6. A system as claimed in claim 5 in which said control valve is electrically operable.

7. A system as claimed in claim 1 in which the means for discharging the contents of said further chamber comprises a diaphragm defining a wall of said further chamber and means for moving said diaphragm to reduce the volume of said further chamber.

8. A system as claimed in claim 7 in which the means for moving said diaphragm comprises a spring.

9. A system as claimed in claim 8 which includes latching means for restraining movement of the diaphragm under the influence of said spring, said latching means being operable when the engine is started to release said diaphragm.

10. A system as claimed in claim 9 in which said latching means comprises a stem secured to the diaphragm and an electromagnetically operable plunger engageable with said stem.

* * * * *